Jan. 17, 1956    R. A. MAGRATH    2,731,533
MOUNTING BASE FOR BOLOMETER
Filed May 5, 1953

INVENTOR
RICHARD MAGRATH
BY *Wilson R Maltby*
*D. C. Snyder*
ATTORNEYS

United States Patent Office 2,731,533
Patented Jan. 17, 1956

2,731,533

MOUNTING BASE FOR BOLOMETER

Richard A. Magrath, Boston, Mass., assignor, by mesne assignments, to the United States of America as represented by the Secretary of the Navy Application May 5, 1953, Serial No. 353,109

12 Claims. (Cl. 201—63)

This invention relates to bolometers, and more particularly to an improvement in the manner in which the heat sensitive element of the bolometer is supported.

As is well known, a bolomter is an electrical instrument for measuring radiant energy by changes in resistance of a blackened heat sensitive element exposed to the radiations. It may also be looked upon as a device that is used to couple a radiation field to an electrical circuit.

In use the bolometer has associated therewith an optical system whereby radiation from any small area of space being investigated may be concentrated on the thermosensitive element. By the use of a bolometer in conjunction with a suitable optical system it is possible, for example, to detect the presence of a body emitting infrared energy.

When the bolometer is exposed to radiated energy the thermosensitive element undergoes an increase in temperature. Consequently the resistance of the thermosensitive material changes. The change of resistance is utilized by passing a current through the bolometer and measuring the change in voltage that occurs when the bolometer temperature changes in response to an increment or decrement in the radiation incident on the bolometer. The change in voltage appearing across the bolometer in response to a change in radiation can be utilized as an indication of the presence of an object or body radiating energy.

The parameters that are significant in determining the behavior of a bolometer include, among others, the properties of the material from which the sensitive element is made, the dimensions of the sensitive element, the rate at which heat energy is removed from the sensitive element, and the manner in which the thermosensitive element is mounted on the base of the envelope of the bolometer.

The primary object of this invention is to provide an improved mode of mounting bolometer elements whereby bolometers are rendered less sensitive to vibration and shock.

It is an object of this invention to provide means for mounting thermosensitive elements whereby to permit an optimum signal-to-noise ratio.

Another object of this invention is to provide a strong, simple and inexpensive mounting means for strips of thermosensitive material in a bolometer.

Another object of this invention is to provide bolometer mounts for either a single or a double strip of thermosensitive material.

A further object of this invention is to provide a satisfactory mount structure which not only provides rigid support for the sensitive elements but also lends itself readily to inclusion in an evacuated and hermetically sealed capsule provided with a window transparent to infrared radiation.

Other objects and many of the attendant advantages of this invention will be readily appreciated as the same becomes better understood by reference to the following detailed description when considered in connection with the accompanying drawings wherein.

Figure 1:
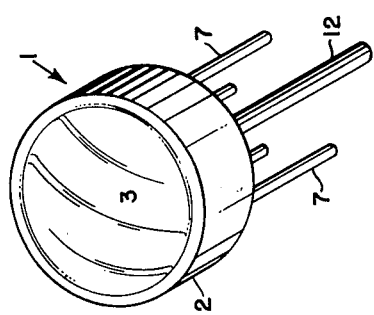
Fig. 1 is a perspective view of an assembled bolometer capsule.

The mounting means to which this invention relates is adapted to be incorporated in a capsule of the type shown in Fig. 1. Capsule 1 includes a silver cap 2 supporting a silver chloride window 3. The silver cap is adapted to fit over a base assembly 4 having a disk-like base 5 provided with holes 6. Mounted within each of the four holes 6 is a wire lead 7, secured in place by means of small glass insulating beads 8 in a manner well known in the art. The center of base 5 is provided with an additional hole 9. Hole 9 is provided with a countersink 10 on the upper surface 11 of base 5. A small tube 12 of suitable metal, e. g., silver, is soldered within hole 9, the end of tube 12 terminating preferably within hole 9.

Figure 2:
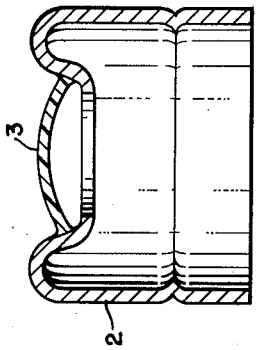
Fig. 2 is a cross-sectional view of the cap member of the capsule of Fig. 1.
Figure 5:
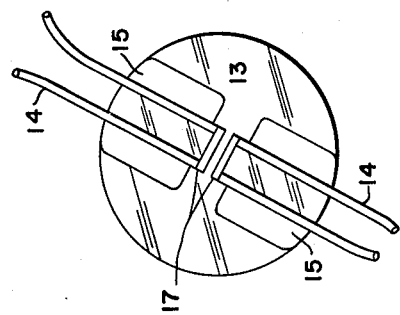
Fig. 5 is a plan view of a double element mount.
Figure 3:
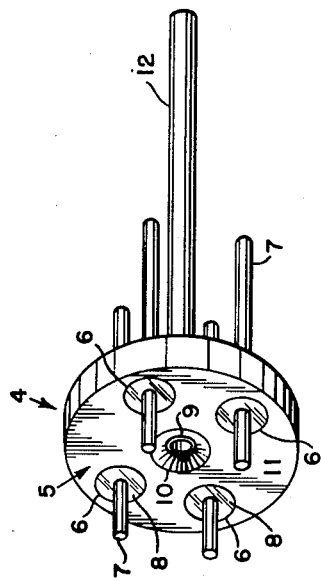
Fig. 3 is a perspective view of a base assembly adapted to receive a bolometer mount.
Figure 4:
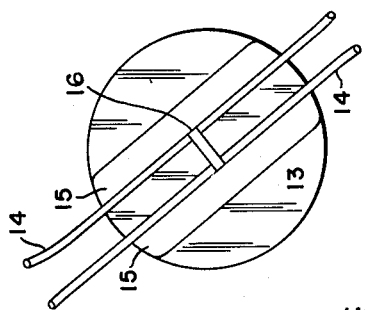
Fig. 4 is a top view of a single element mount.

Base 5 is adapted to receive a subassembly comprising at least one thermosensitive element and the mount therefor. In Fig. 4 is illustrated a mount with but a single thermosensitive element. Fig. 5 shows a similar mount with two thermosensitive elements. The mount comprises a glass disk 13, preferably about ⅜ of an inch in diameter and ¹⁄₁₆ of an inch thick. Two silver wires 14, preferably about 0.010 inch in diameter, are secured parallel to each other on the disk. The wires are secured to the disk by means of a silver cement 15.

Single element 16 is secured to the wires 14, which in turn are secured to the glass disk, much in the same manner that double elements 17 are secured, in both embodiments the thermosensitive elements being disposed across from one silver wire to the other at an angle of approximately 90° to each wire. Since the silver wires support the elements, the latter are automatically spaced about 0.010" from the glass disk. The silver wires and the elements are soldered to each other, the wires so affixed serving as rigid terminals for the thermosensitive elements and as leads for connecting the elements into a circuit. As seen from Fig. 5, in the case of a double strip bolometer, two thermosensitive elements are mounted across four insulated lengths of silver wire.

Figure 6:
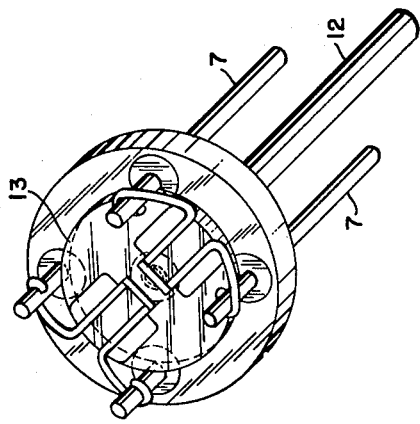
Fig. 6 is a perspective view of a double element mount secured to the base subassembly of Fig. 3.

After the mounts have been assembled, they are attached to base assembly 4. Disk 13 is placed on base 5 and the ends of wires 14 are soldered to wire leads 7. As shown in Fig. 6, wires 14 are preferably curved around leads 7 prior to soldering in order to provide greater area of contact. Sufficient space is left between disk 13 and base 5 to permit evacuation by means of tube 12.

One of the virtues of this design is that it lends itself well to mass production. In practice, a strip of masking tape equal in width to the length of the desired sensitive elements is placed across the disk. A cement, e. g. "Hanovia" silver cement, is then painted on the glass disk on each side of the tape and the tape removed. Then two silver wires are placed parallel to each other on the cement, one on each side of the clear area left by the tape. This subassembly is then baked at 400° C. for a period of from 5 to 15 minutes to convert the silver cement into a layer of silver that binds the wires firmly in place. Finally sensitive elements are then soldered across from one wire to the other.

Where double strips are to be mounted, the procedure is modified to the extent that an additional narrow strip of masking tape is fastened across the diameter of the disk at right angles to the first long piece of tape already secured to the disk. The silver cement is then applied in the same manner, with the modified result of silver cement being applied to four separate areas of the disk. After the silver wires have been baked on, a razor blade or a similar cutting instrument is used to snip out small sections of the silver wires spanning the gaps in the "Hanovia" contacts. By severing the parallel wires near the center of the disk, four separate contacts electrically insulated from each other are obtained. Then two platinum elements 17 may be mounted parallel to each other across the four insulated lengths of the silver wire, the finished subassembly appearing as illustrated in Fig. 5.

The thermosensitive material, preferably platinum, is rolled from Wollaston wire into thin strip form. In general strips that are no thinner than 1000 A. are free from feathered edges and visual flaws detectable by microscopic examination. The usable portion of the wire from which the strips are rolled decreases with the thickness as the thickness is decreased below 1000 A. The minimum thickness to which the wire should be rolled is a thickness of an order of 500 A. Thinner ribbons can be obtained but the edges of such ultra thin strips are often feathered or frayed and invariably result in current noise. Furthermore, with thicknesses less than 500 A. the blackening material placed on the strip becomes comparable in mass to that of the platinum itself and any small decrease in the thickness in the platinum makes very little difference in determining the speed of response of the blackened element.

The step of securing the sensitive elements to the silver wires on the glass disk requires manipulative skill. In practice platinum strips as thin as 500 A. have been handled with such tools as toothpicks and small wires. In order to facilitate handling of the thermosensitive platinum elements, a length of platinum ribbon rolled to the desired thickness is attached to a blotter or a similar card by means of a soft wax. It is then cut into appropriate lengths depending upon the particular type of bolometer under construction. This segment is transferred from the card to the mount by means of a toothpick or similar tool. One of the ends of the element is placed against one of the silver wires on the base and soldered thereto with a small soldering tip. This operation is preferably carried out under a binocular microscope of low power. Then by gently working the element with the toothpick it is positioned and soldered at the other end to the other silver wire. The surface tension of the molten solder pulls the strip ends around the silver wire sufficiently to make the element taut. In practice the silver wire contacts on the base are tinned with a 40–60 solder prior to the attachment of the sensitive elements. With the contacts already tinned, it is not necessary to add solder in attaching the element. It is sufficient to apply a very small amount of zinc chloride flux to the contact and to press the element against the contact with a small pointed hot iron. Caution must be observed in order to prevent application of too much solder on the contact, there being a tendency for it to flow along the length of the element, particularly if the element is thicker than 1000 A. With a very thin element excess solder is less troublesome. In fact, it is frequently difficult to make the solder wet extremely thin platinum.

It is essential that the smallest possible quantity of zinc chloride flux be used in the soldering process. If too great an amount of flux is used, it flows along the element, and, since the very thinnest elements cannot be washed subsequent to their mounting, the flux remains and may introduce noise. Furthermore, the presence of zinc chloride salt on a bolometer element destroys gold black. If elements coated with flux are blackened, the bolometer loses sensitivity and the black turns grey within a few days.

Once the platinum elements are appropriately mounted on the bases 5, a coating of blackening material is applied. This coating acts as an absorbing layer to trap radiation and to convert it into heat at the thermosensitive element. In practice, the blacking operation is carried out using metallic gold fused to a molybdenum filament. The gold is purified by heating the filament in an atmosphere of hydrogen. The blacking operation is also carried out in an atmosphere of hydrogen at a pressure of about 2 mm. of mercury with the bolometers to be blackened placed approximately 1" to 3" from the filament, the bolometer and the filament both being enclosed within an evacuation chamber such as a bell jar. In the blacking operation the filament heating is increased until visible clouds of black arise from either side of the filament. The temperature is adjusted so that the densest portion of the cloud strikes the platinum element and this temperature is maintained until the platinum appears completely black when viewed at normal incidence through the transparent walls of the evacuation apparatus. In practice aluminum black and a combination of aluminum and gold black have also been employed. Both provide a satisfactory response without introducing undue noise even when heated to a temperature well over 100° C.

Once the elements have been blackened, base 5 is secured to the cap portion 2 by means of soft soldering, the completed capsule being illustrated in Fig. 1. The completed capsule structure may then be evacuated by means of tube 12. After evacuation, tube 12 is preferably sealed off by pinching and solder. The completed bolometer capsule may then be incorporated into an appropriate measuring circuit by means of its wire leads 7.

Bolometers constructed according to this invention have been found to provide a satisfactory signal to noise ratio and withstand normal shock and vibration without adverse effects on calibration.

Obviously many modifications and variations of the present invention are possible in the light of the above teachings. It is, therefore, to be understood that within the scope of the appended claims the invention may be practiced otherwise than as specifically described.

What is claimed is:

1. The combination comprising a disk of insulating material, spaced segments of conductive material coated on one face thereof, each of said segments having a wire secured thereto, said wires being in parallel spaced relation with respect to each other, and thermosensitive material in strip form interconnecting said wires.

2. The combination comprising a disk of insulating material, spaced wires conductively secured to and parallel to one face of said disk in parallel spaced relation with respect to each other, and a strip of thermosensitive material interconnecting said wires.

3. The improvement as set forth in claim 2, further characterized in that the insulating material is glass.

4. The improvement as set forth in claim 2, further characterized in that the spaced wires are secured to the disk by conductive cement.

5. The improvement as set forth in claim 4, further characterized in that the spaced wires are cemented to the disk by a silver cement.

6. In an electrical instrument for measuring radiant energy and including a base portion, a cap portion having a window transparent to radiation, said cap portion being hermetically sealed to said base portion, a plurality of terminal leads mounted in said base portion and extending on both sides of said base portion, said leads being insulated with respect to said base portion, the improvement comprising, a disk of insulating material within said cap portion and disposed in parallel spaced relation with the inner surface of said base portion, spaced segments of conductive material coated on one face of said disk, wires conductively secured to each of said segments and in parallel spaced relation with respect to each other, at least one end of each wire being conductively secured to one of said terminal leads, and thermosensitive material in strip form interconnecting said terminal wires.

7. The combination of claim 6, further characterized in that the thermosensitive material is platinum.

8. The combination of claim 7, further characterized in that the platinum element is coated with a layer of blackening material.

9. The combination of claim 8, further characterized in that the blackening material is gold.

10. The combination of claim 6, further characterized in that the thermosensitive material has a thickness ranging between 500 and 1000 Angstrom units.

11. In an electrical instrument for measuring radiant energy the improvement comprising a disk of insulating material, a plurality of wires conductively secured to one face of said disk, said wires being parallel to the face of said disk and to each other, and strips of thermosensitive material interconnecting said parallel wires.

12. The combination comprising a disk of insulating material, a plurality of wires conductively secured to one face of said disk, there being an even number of wires parallel to said face and to each other, and strips of thermosensitive material interconnecting said parallel wires.

References Cited in the file of this patent

UNITED STATES PATENTS

| | | |
|---|---|---|
| 1,880,289 | Sukumlyn | Oct. 4, 1932 |
| 2,461,878 | Christensen et al. | Feb. 15, 1949 |
| 2,516,873 | Havens et al. | Aug. 1, 1950 |